United States Patent [19]
Kim et al.

[11] Patent Number: 5,796,739
[45] Date of Patent: Aug. 18, 1998

[54] SUBSCRIBER INPUT/OUTPUT DEVICE OF HIGH-SPEED PACKET SWITCHING SYSTEM WITH PARALLEL COMMON BUS TYPE

[75] Inventors: Dong Won Kim; Won Ryu; Dae Ung Kim, all of Daejeon, Rep. of Korea

[73] Assignees: Electronics and Telecommunications Research Institute, Daejeon; Korea Telecommunication Authority, Seoul, both of Rep. of Korea

[21] Appl. No.: 685,568

[22] Filed: Jul. 24, 1996

[30] Foreign Application Priority Data

Jul. 24, 1995 [KR] Rep. of Korea ............... 1995-21930

[51] Int. Cl.⁶ ........................................... H04L 12/56
[52] U.S. Cl. ................................. 370/401; 370/440
[58] Field of Search ........................... 370/352, 387, 370/388, 389, 384, 395, 394, 401, 402, 403, 404, 428, 440, 444, 445, 447, 449, 451, 461, 462, 535–541; 340/825.08; 371/30, 32, 33, 35, 37.1

[56] References Cited

U.S. PATENT DOCUMENTS

| 5,048,012 | 9/1991 | Gulick et al. | 370/472 |
| 5,084,871 | 1/1992 | Carn et al. | 370/462 |
| 5,115,430 | 5/1992 | Hahne | 370/440 |
| 5,282,198 | 1/1994 | Punj | 370/440 |

FOREIGN PATENT DOCUMENTS

0405042  6/1989  European Pat. Off. .

*Primary Examiner*—Dang Ton
*Attorney, Agent, or Firm*—Nixon & Vanderhye P.C.

[57] ABSTRACT

A subscriber input/output device of a high-speed packet switching system with a parallel common bus type is disclosed. The subscriber input/output device uses a coaxial cable to establish a star network of a radius of hundreds of meters, and the star network is arbitrated by a polling method to be used as a near communication network or an internal link network of a large scale communication system. The high-speed performance of 320 Mbps-class with a relatively simple medium access protocol for transmitting data through a common parallel bus is obtained, and broadcasting and multicasting are supported.

4 Claims, 7 Drawing Sheets

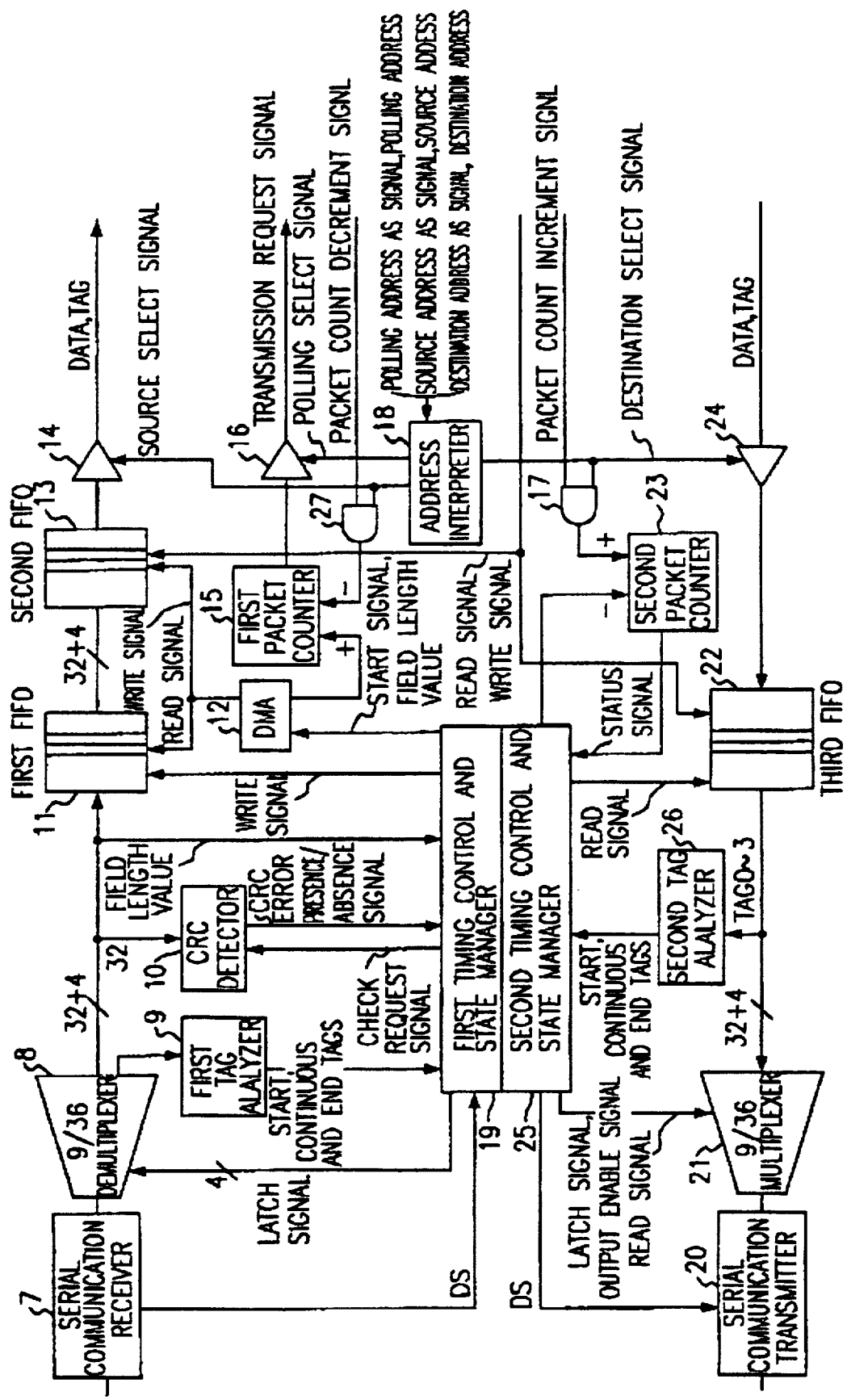

SUBSCRIBER INPUT/OUTPUT DEVICE OF HIGH-SPEED PACKET SWITCHING SYSTEM WITH PARALLEL COMMON BUS TYPE

BACKGROUND OF THE INVENTION

The present invention relates to a subscriber input/output device of a high-speed packet switching system with a parallel common bus type, and more particularly to such a subscriber input/output device of a high-speed packet switching system with a parallel common bus type for supporting point-to-point communication and point-to-multipoint communication between nodes, and rapidly and accurately transmitting a packet generated from each node.

A conventional packet switching or message switching communication system uses a low-speed LAN (Local Area Network) technique of a loosely coupled system, such as a serially connected token ring, an ethernet of a serial bus form, a token bus, etc., and uses a high-speed MAN (Metropolitan Area Network) technique using an optical fiber etc., such as a FDDI (Fiber Distributed Data Interface), a DQDB (Distributed Queue Dual Bus), an ATMR (Asynchronous Transfer Mode Ring), etc. Moreover, a common memory communication method and a common system bus method of a tightly coupled form are used in a parallel computer and a small-sized packet switching system.

A LAN or a MAN using relatively complicated medium access communication protocol for communication between distributed nodes of a short distance is high in cost relative to its performance (less than about 100 Mbps) since an optical fiber and a high-speed device are used. Meanwhile, the common memory communication method and the common system bus method which is tightly coupled take a longarbitration time since the right to use is given after mediating request/acknowledgement/recognition. Therefore, a common medium is not well utilized, and the number of accommodated nodes is small. Further since such methods have a back plane mounting scale within one self, it is impossible to accommodate the distributed nodes of a short distance.

SUMMARY OF THE INVENTION

It is an object of the present invention to provide a subscriber input/output device of a high-speed packet switching system with a parallel common bus type, wherein a star network of a radius of hundreds of meters is established by using a coaxial cable of a relatively low price on a common system bus basis, the star network is arbitrated by a polling method to be used as a near communication network or an internal link network of a large scale communication system, the high-speed performance of 320 Mbps with a relatively simple medium access protocol for transmitting data through a common parallel bus is obtained, broadcasting and multicasting are supported, and an extension up to 192 input/output channels is possible.

In accordance with one aspect of the present invention, a subscriber input/output device of a high-speed packet switching system with a parallel common bus type includes:

a serial communication receiver for receiving serial data of packet data and a tag from the exterior, and generating a data strobe signal;

a demultiplexer for latching the output of the serial communication receiver according to a latch signal, and generates data and a tag;

a first tag analyzer for receiving the tag of the demultiplexer, and detecting a start tag, a continuous tag and an end tag;

a cyclic redundancy code detector for receiving an error detecting code from the demultiplexer, and detecting a cyclic redundancy code according to a check request signal;

a direct memory access circuit for generating a read signal and a write signal by a field length value and a start signal;

a first FIFO (First-In First-Out) circuit for storing the output data of the demultiplexer according to a write signal, and generating the output data of the demultiplexer according to the read signal of the direct memory access circuit;

a second FIFO circuit for storing the output of the first FIFO circuit according to the write signal of the direct memory access circuit, and generating the output of the first FIFO circuit according to a read signal received from the exterior;

an address interpreter for receiving a polling address, a source address, a destination address, a polling address strobe signal, a source address strobe signal and a destination address strobe signal from the exterior, and generating a polling select signal, a source select signal and a destination select signal;

a first AND gate for ANDing the source select signal of the address interpreter with an external packet count decrement signal, and generating a packet count decrement signal;

a first packet counter for increasing a count value according to a packet count increment signal of the direct memory access circuit, and decreasing the count value according to the packet count decrement signal of the first AND gate;

a third FIFO circuit for storing data and a tag received from the exterior according to an external write signal, and generating the data and the tag according to a read signal;

a second AND gate for ANDing the destination select signal of the address interpreter with an external packet count increment signal, and generating a packet count increment signal;

a second packet counter for increasing a count value according to the packet count increment signal of the second AND gate, decreasing the count value according to a packet count decrement signal, and generating a status signal;

a second tag analyzer for receiving the tag of the third FIFO circuit, and detecting a start tag, a continuous tag and an end tag;

a multiplexer for multiplexing the output of the third FIFO circuit by a latch signal and an output enable signal;

a serial communication transmitter for converting the output of the multiplexer to serial data by a data strobe signal, and generating the converted data;

a first timing control and state manager for supplying latch signals to the demultiplexer by the data strobe signal of the serial communication receiver, receiving the start, continuous and end tags from the first tag analyzer, receiving a field length value of the demultiplexer and supplying a write signal to the first FIFO circuit when the tag is a start state, continuing to supply the write signal to the first FIFO circuit when the tag is a continuous state, supplying a check request signal for cyclic redundancy code detecting timing to the cyclic redundancy code detector when the tag is an end state, receiving an error presence/absence signal from the cyclic redundancy code detector, eliminating a packet when there are errors, and receiving one frame and supplying a field length value and a start signal to the direct memory access circuit when there are no errors; and a second timing control and state manager for supplying a read signal to the third FIFO circuit when the status signal is received from the second packet counter, receiving start, continuous and end tags from the second tag analyzer, sequentially supplying a latch signal and output enable signals to the multiplexer, supplying a data strobe signal to the serial communication transmitter, and supplying a count decrement signal to the second packet counter.

BRIEF DESCRIPTION OF THE ATTACHED DRAWINGS

FIG. 4 is a block diagram of a subscriber input/output device according to the present invention;

DETAILED DESCRIPTION OF PREFERRED EMBODIMENT

Figure 1:
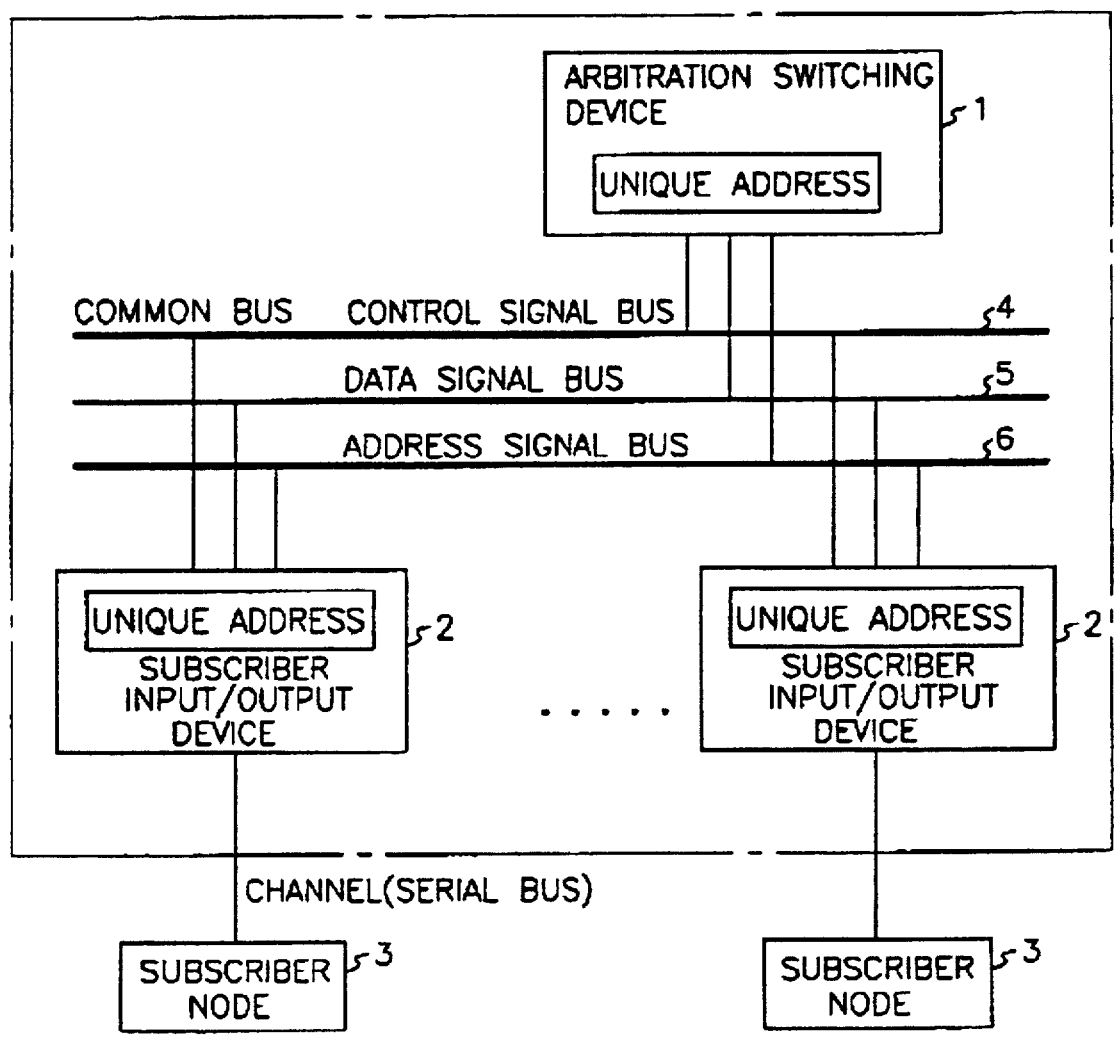
FIG. 1 shows an overall construction of a high-speed packet switching system with a parallel common bus type.

FIG. 1 shows an overall construction of a high-speed packet switching system with a parallel common bus type. Reference numeral 1 designates aarbitration switching device, 2 a subscriber input/output device, and 3 a subscriber node. Reference numerals 4, 5 and 6 are a parallel common bus respectively representing a control signal bus, a data signal bus and an address signal bus.

The high-speed packet switching system with the parallel common bus type is broadly classified into 3 functional parts: the subscriber input/output device 2, thearbitration switching device 1, and the parallel common bus. The input/output device 2 is serially connected to each subscriber node 3, and takes charge of the input/output of packet switching. Thearbitration switching device 1arbitrations the right to use of the parallel common bus which is a common medium between the subscriber input/output devices 2, and transmits packet data. The parallel common bus is constructed with the data signal bus 5 which serves as an actual transport route of the packet data, the control signal bus 4 between the subscriber input/output device 2 and thearbitration switching device 1, and the address signal bus 6.

Each functional part has a unique address. There are a system identification (ID) to which 3 bits are assigned, and a subscriber input/output device ID to which 6 bits are assigned. The system ID indicates an ID of thearbitration switching device 1 and an address of the packet switching system which can accommodate a maximum of 3 devices as a linked structure. The subscriber input/output device ID indicates an address of the subscriber input/output device 2 which can accommodate 64 channels per device. Therefore, when the enlarged structure linked by 3 devices is used, a maximum of 192 channels are accommodated. A unique address adding the system ID to the subscriber input/output device ID is assigned to each channel.

Figure 2:
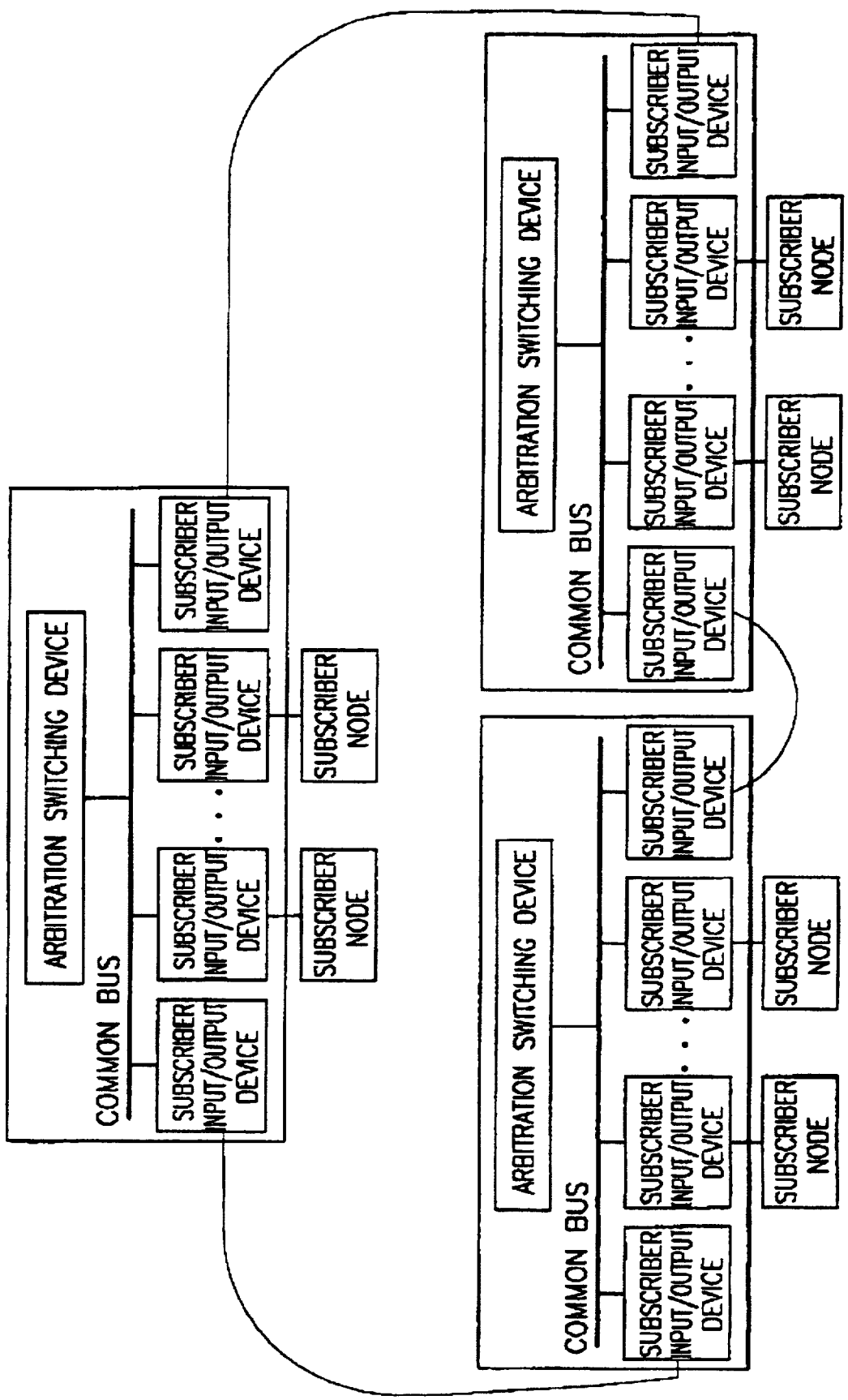
FIG. 2 shows a linkage among several high-speed packet switching systems with a parallel common bus type.

FIG. 2 illustrates a link enlarged construction of the high-speed packet switching system with the parallel common bus type. The subscriber input/output devices 2 are connected to each another between switching systems. In the broadcasting and multicasting of the link enlarged construction, thearbitration switching device in which the subscriber input/output device 2 receiving a packet is contained becomes a sourcearbitration switching device. The ID of the sourcearbitration switching device and a tag from the subscriber node 3, and generates a data strobe (DS) signal. A demultiplexer 8 latches the output of the serial communication receiver 7 according to latch signals of a first timing control and state manager 19, and generates 32-bit data and a 4-bit tag. A first tag analyzer 9 receives the tag of the demultiplexer 8, and detects a SOF tag, a COF tag and an EOF tag. A CRC detector 10 receives an error detecting code from the demultiplexer 8, and detects a CRC code according to a check request signal of the first timing control and state manager 19. A DMA (direct memory access) circuit 12 supplies a read signal to a first first-in first-out circuit (FIFO) 11 by a field length value and a start signal of the first timing control and state manager 19, and supplies a write signal to a second FIFO 13. The first FIFO 11 stores the output data of the demultiplexer 8 according to a write signal of the first timing control and state manager 19, and generates the output data of the demultiplexer 8 according to the read signal of the DMA circuit 12. The second FIFO 13 stores the output of the first FIFO 11 according to the write signal of the DMA circuit 12, and generates the output of the first FIFO 11 according to a read signal of thearbitration switching device 1.

A first transmitting buffer 14 supplies the data and the tag which is the output of the second FIFO 13 to thearbitration switching device 1 according to a source select signal of an address interpreter 18. A first AND gate 27 ANDs the source select signal of the address interpreter 18 with a packet count decrement signal of thearbitration switching device 1. A first packet counter 15 increase a count value according to a packet count increment signal of the DMA circuit 12, and decreases the count value according to a packet count decrement signal of the first AND gate 27. A second transmitting buffer 16 receives the count value of the first packet counter 15, and supplies a transmission request signal to thearbitration switching device 1 according to a polling select signal of the address interpreter 18. The address interpreter 18 receives a polling address, a source address, a destination address, a polling address AS (address strobe) signal, a source address AS signal and a destination address AS signal from thearbitration switching device 1, and generates the polling select signal, the source select signal and a destination select signal.

A receiving buffer 24 receives the data and the tag from thearbitration switching device 1, and supplies the data and the tag to a third FIFO 22 according to the destination select signal of the address interpreter 18. The third FIFO 22 stores the output of the receiving buffer 24 according to a write signal of thearbitration switching device 1, and supplies the output of the receiving buffer 24 to a multiplexer 21 and a second tag analyzer 26 according to a read signal of a second timing control and state manager 25. A second AND gate 17 ANDs the destination select signal of the address interpreter 18 with a packet count increment signal of thearbitration switching device 1. A second packet counter 23 increases a count value according to a packet count increment signal of the second AND gate 17, decreases the count value according to a packet count decrement signal of the second timing control and state manager 25, and supplies a status signal to the second timing control and state manager 25. The multiplexer 21 multiplexes the output of the third FIFO 22 by a latch signal and an output enable signal of the second timing control and state manager 25. A serial communication transmitter 20 converts the output of the multiplexer 21 to 9-bit serial data by a data strobe signal of the second timing control and state manager 25, and supplies the converted data to the subscriber node 3. The first timing control and state manager 19 supplies the latch signals to the demultiplexer 8 by the DS signal of the serial communication receiver 7, and receives the SOF, COF and EOF tags from the first tag analyzer 9. If the tag is a start state, the first timing control and state manager 19 receives a field length value of the demultiplexer 8, and supplies the write signal to the first FIFO 11. If the tag is a continuous state, the first timing control and state manager 19 continues to supply the write signal to the first FIFO 11. If the tag is an end state, the first timing control and state manager 19 supplies the device is a source system ID (SSID).

Figure 3:
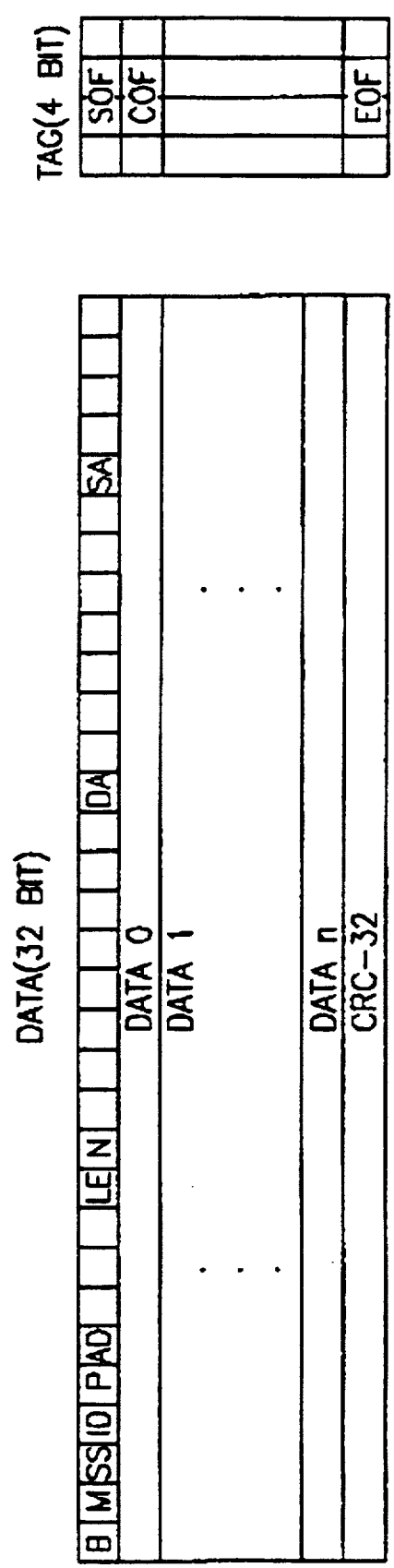
FIG. 3 shows a general packet format and a header field composed of a 32-bit data and a 4-bit tag.

Referring to FIG. 3, a construction of a packet format and a head field has 32-bit data and a 4-bit tag. The 32-bit data is constructed with a head field, a 32-bit data field and a cyclic redundancy code (CRC-32) indicating an error detecting code. The head field is divided into 1-bit B data for indicating a broadcasting signal, 1-bit M data for indicating a multicasting signal, source system ID (SSID) data which is set to "0" from the source subscriber input/output device 2 when the B or M data is set and inserts an its own system ID by thearbitration switching device 1, padding byte count (PAD) data for indicating the number of remaining bytes to be filled when a packet length is not divided by a multiple of 4 in order to generate 4-byte alignment data, length (LEN) data for indicating the length of an overall packet represented by the unit of a byte, destination address (DA) data for indicating a destination address, or indicates a group address when the M data is set, and source address (SA) data for indicating a source address.

The 4-bit tag includes a SOF (start of frame) tag indicating a start state, a COF (continuous of frame) tag indicating a continuous state, and an EOF (end of frame) tag indicating an end state.

FIG. 4 illustrates the subscriber input/output device. A serial communication receiver 7 receives serial data of packet check request signal for CRC detecting timing to the CRC detector 10, and receives an error presence/absence signal from the CRC detector 10. If there is an CRC error, the first timing control and state manager 19 eliminates the packet, and if no, the first timing control and state manager 19 receives one frame and supplies the field length value and the start signal to the DMA circuit 12. The second timing control and state manager 25 supplies the read signal to the third FIFO 22 when the status signal is received from the second packet counter 23, receives the SOF, COF and EOF tags from the second tag analyzer 26, and sequentially supplies the latch signal and the output enable signal to the multiplexer 21. Further, the second timing control and state manager 25 supplies the DS signal to the serial communication transmitter 20, and supplies the count decrement signal to the second packet counter 23.

In operation, the subscriber input/output device is connected to the subscriber node 3 by a TAXI (Transparent Asynchronous transmitter-received Interface) serial communication controller. The subscriber input/output device serially receives a packet, transmits the received packet to the parallel common bus. The packet received from the parallel common bus is transmitted through the TAXI serial communication controller to the subscriber node 3.

When the packet is serially transmitted from the subscriber node 3, 9 bits of 1-byte packet data and a 1-bit tag are serially transmitted. The serial communication receiver 7 serially receives the packet generated from the subscriber node 3, and separately converts the received serial data into 1-byte parallel data and a 1-bit tag. In this case, the serial communication receiver 7 supplies the DS signal to the first timing control and state manager 19. The first timing control and state manager 19 generates a first latch signal responsive to the firstly received DS signal, a second latch signal responsive to the secondly received DS signal, a third latch signal responsive to the thirdly received DS signal, a fourth latch signal responsive to the fourthly received DS signal, and the first latch signal responsive to the fifthly received DS signal. That is, the first timing control and state manager 19 generates the latch signals by a modular-4 method.

The demultiplexer 8 latches the output of the serial communication receiver 7 according to 4 latch signals of the first timing control and state manager 19, and converts the received one-byte data to 32-bit data by aligning the one-byte data by the unit of 4 bytes suitable for the data width of the parallel common bus. Simultaneously, the demultiplexer 8 converts the 1-bit tag to a 4-bit tag. The 4-bit tag is supplied to the first tag analyzer 9, and the 32-bit parallel data and the 4-bit tag are supplied to the first FIFO 11. A CRC error code is applied to the CRC detector 10.

The first timing control and state manager 19 stores the field length value when the tag detected by the first tag analyzer 9 is a start state, and supplies the write signal to the first FIFO 11. If the tag is a continuous state, the first timing control and state manager 19 continues to supply the write signal to the first FIFO 11. If the tag is an end state, the first timing control and state manager 19 supplies the check request signal to the CRC detector 10, and receives the CRC error presence/absence signal from the CRC detector 10. If there is an CRC error, the first timing control and state manager 19 eliminates the packet, and if no, the first timing control and state manager 19 supplies the field length value and the start signal to the DMA circuit 12.

The DMA circuit 12 supplies the read signal to a first FIFO 11 when one perfect packet is received, and supplies the write signal to the second FIFO 13 to shift one packet to the second FIFO 13. The DMA circuit 12 increases the packet count value of the first packet counter 15 by "1". To detect one perfect packet, the first tag analyzer 9 sequentially detects the SOF, COF and EOF tags from the 4-bit tag generated from the demultiplexer 8, and supplies the detected tag to the first timing control and state manager 19. The first timing control and state manager 19 compares a CRC value for the entire packet data with a value of a CRC field detected from the CRC detector 10. If they are equal, the first timing control and state manager 19 judges that one perfect packet has been received without any error.

The address interpreter 18 connected to the parallel common bus interprets the polling address, the source address and the destination address to check whether its own is selected. The address interpreter 18 receives the polling address AS signal and the polling address, and decodes the polling address to check whether its own address is equal to the polling address. If they are identical, and if the count value of the first packet counter 15 is above "1", that is, if there is a packet to be transmitted in the second FIFO 13, the address interpreter 18 generates the polling select signal so as to generate the transmission request signal through the second transmitting buffer 16. The address interpreter 18 also receives the source address AS signal and the source address, and decodes the source address. If the source address is equal to its own address, the address interpreter 18 generates the source select signal. The 32-bit data and the 4-bit tag stored in the second FIFO 13 are supplied to the first transmitting buffer 14 in response to the read signal of thearbitration switching device 1, and the output of the first transmitting buffer 14 is supplied to the common bus in response to the source select signal of the address interpreter 18. One packet is generated, the packet count decrement signal is generated from thearbitration switching device 1 and ANDed in the first AND gate 27 together with the source select signal of the address interpreter 18. The output of the first AND gate 27 is supplied to the first packet counter 15 to decrease the packet count value by "1". That is, it is indicated that one packet which is a standby state has been transmitted.

In case of point-to-point communication, the destination address is identical to its own address. If the destination address is the broadcasting, the address is received. If the destination address is the multicasting, when a group address indicated by the destination address is equal to its own group address, the address is received.

If the destination address AS signal is activated, the address interpreter 18 receives and decodes the destination address. If its own address is equal to the destination address, the address interpreter 18 supplies the destination select signal to the receiving buffer 24. The receiving buffer 24 supplies input data to the third FIFO 22 in response to the destination select signal. The third FIFO 22 stores the output of the third FIFO 22 in response to the write signal of thearbitration switching device 1. If one packet is completely stored in the third FIFO 22, the packet count increment signal of thearbitration switching device 1 and the destination select signal of the address interpreter 18 are ANDed in the second AND gate 17. The second packet counter 23 increases the packet count value by "1" by the output of the second AND gate 17. The second packet counter 23 supplies the status signal of a current count value to the second timing control and state manager 25. If the status signal generated from the second packet counter 23 is not "0", the second timing control and state manager 25 supplies the read signal to the third FIFO 22. The third FIFO 22 supplies 4 bytes including the 4-bit tag to the multiplexer 21. The 4-bit tag is further supplied to the second tag analyzer 26. The second tag analyzer 26 analyzes tag information, and supplies the SOF, COF and EOF tags to the second timing control and state manager 25. The second timing control and state manager 25 supplies the read signal to the third FIFO 22 until the EOF tag is received, thereby reading out one packet.

The second timing control and state manager 25 supplies one latch signal per one read signal to the multiplexer 21, and sequentially generates output enable signals OE1, OE2, OE3 and OE4 per one latch signal. The second timing control and state manager 25 further supplies the DS signal to the serial communication transmitter 20 in response to the output enable signals OE1, OE2, OE3 and OE4. If one packet is generated from the third FIFO 22, the second timing control and state manager 25 supplies the packet count decrement signal to the second packet counter 23. The second timing control and state manager 25 repeats a packet transmitting process until the count value of the second packet counter 23 is "0".

The multiplexer 21 transmits the latched 4-byte data including the 4-bit tag to the serial communication transmitter 20 according to the output enable signals OE1, OE2, OE3 and OE4 by the unit of one-byte data and a one-bit tag. The serial communication transmitter 20 converts the one-byte data and the one-bit tag to serial 9 bits according to the DS signal, and supplies the serial 9 bits to the subscriber node 3.

Figure 5A:
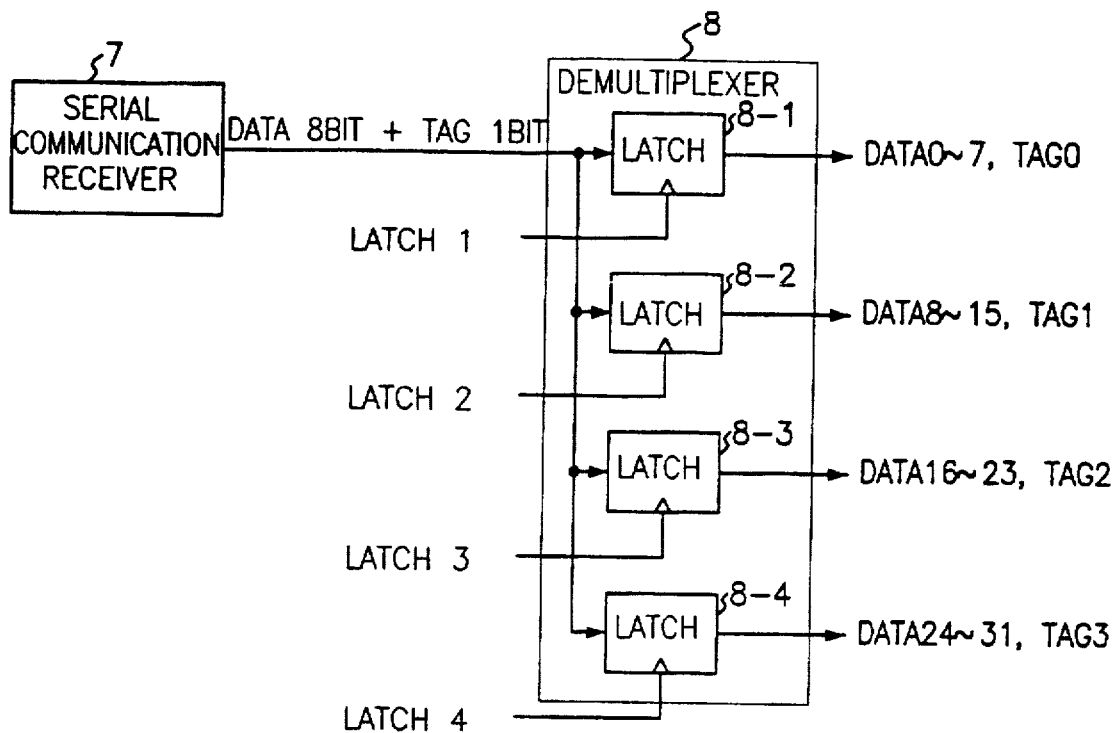
FIG. 5A is a block diagram of a demultiplexer of the subscriber input/output device of FIG. 4.
Figure 5B:
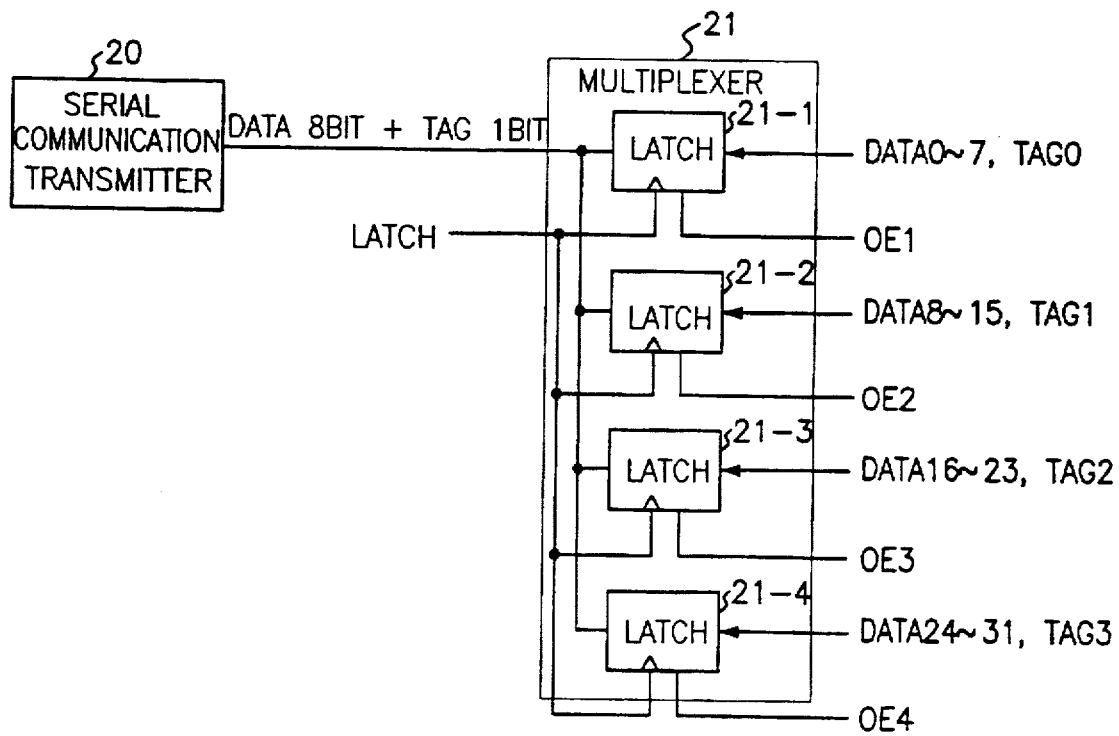
FIG. 5B is a block diagram of a multiplexer of the subscriber input/output device of FIG. 4.

FIGS. 5A and 5B illustrate the demultiplexer 8 and multiplexer 21 of the subscriber input/output device of FIG. 4, respectively.

Referring to FIG. 5A, the firstly received one-byte data and one-bit tag from the serial communication receiver 7 is latched in a first latch circuit 8-1 by the first latch signal generated from the first timing control and state manager 19. The secondly received one-byte data and one-bit tag from the serial communication receiver 7 is latched in a second latch circuit 8-2 by the second latch signal generated from the first timing control and state manager 19. The thirdly received one-byte data and one-bit tag from the serial communication receiver 7 is latched in a third latch circuit 8-3 by the third latch signal generated from the first timing control and state manager 19. The fourthly received one-byte data and one-bit tag from the serial communication receiver 7 is latched in a fourth latch circuit 8-4 by the fourth latch signal generated from the first timing control and state manager 19. Thus, 32-bit data is sequentially generated by the unit of one byte, and a 4-bit tag is sequentially generated by the unit of one bit.

Referring to FIG. 5B, a first latch circuit 21-1 latches the 32-bit data and the 4-bit tag generated from the third FIFO 22 by the latch signal generated from the second timing control and state manager 25, and supplies one-byte data and a one-bit tag to the serial communication transmitter 20 according to the first output enable signal OE1 of the second timing control and state manager 25. A second latch circuit 21-2 latches the 32-bit data and the 4-bit tag generated from the third FIFO 22 by the latch signal generated from the second timing control and state manager 25, and supplies the one-byte data and the one-bit tag to the serial communication transmitter 20 according to the second output enable signal OE2 of the second timing control and state manager 25. A third latch circuit 21-3 latches the 32-bit data and the 4-bit tag generated from the third FIFO 22 by the latch signal generated from the second timing control and state manager 25, and supplies the one-byte data and the one-bit tag to the serial communication transmitter 20 according to the third output enable signal OE3 of the second timing control and state manager 25. A fourth latch circuit 21-4 latches the 32-bit data and the 4-bit tag generated from the third FIFO 22 by the latch signal generated from the second timing control and state manager 25, and supplies the one-byte data and the one-bit tag to the serial communication transmitter 20 according to the fourth output enable signal OE4.

Figure 6A:
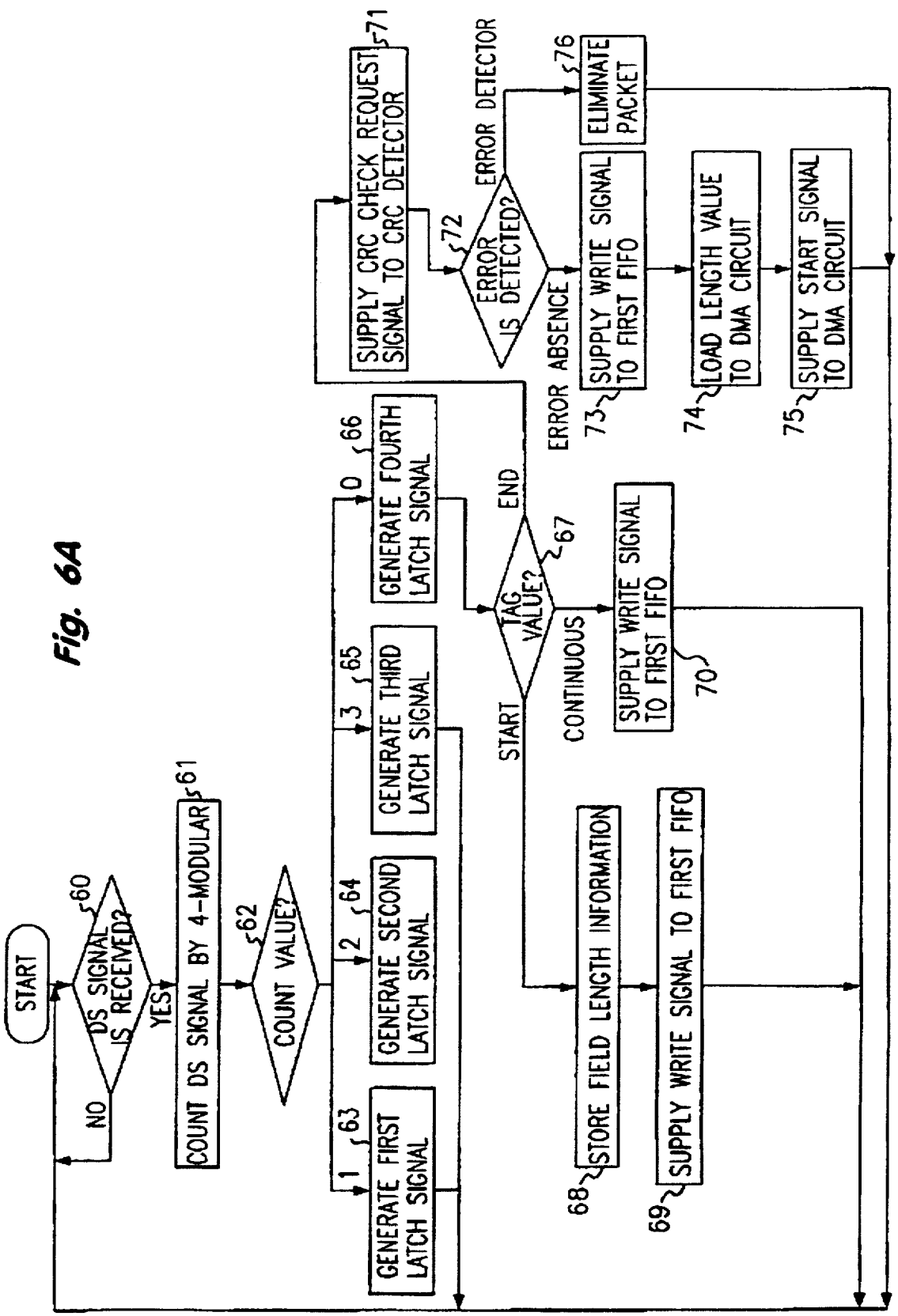
FIG. 6A is a flow chart showing an operation of a first timing control and state manager of the subscriber input/output device of FIG. 4.
Figure 6B:
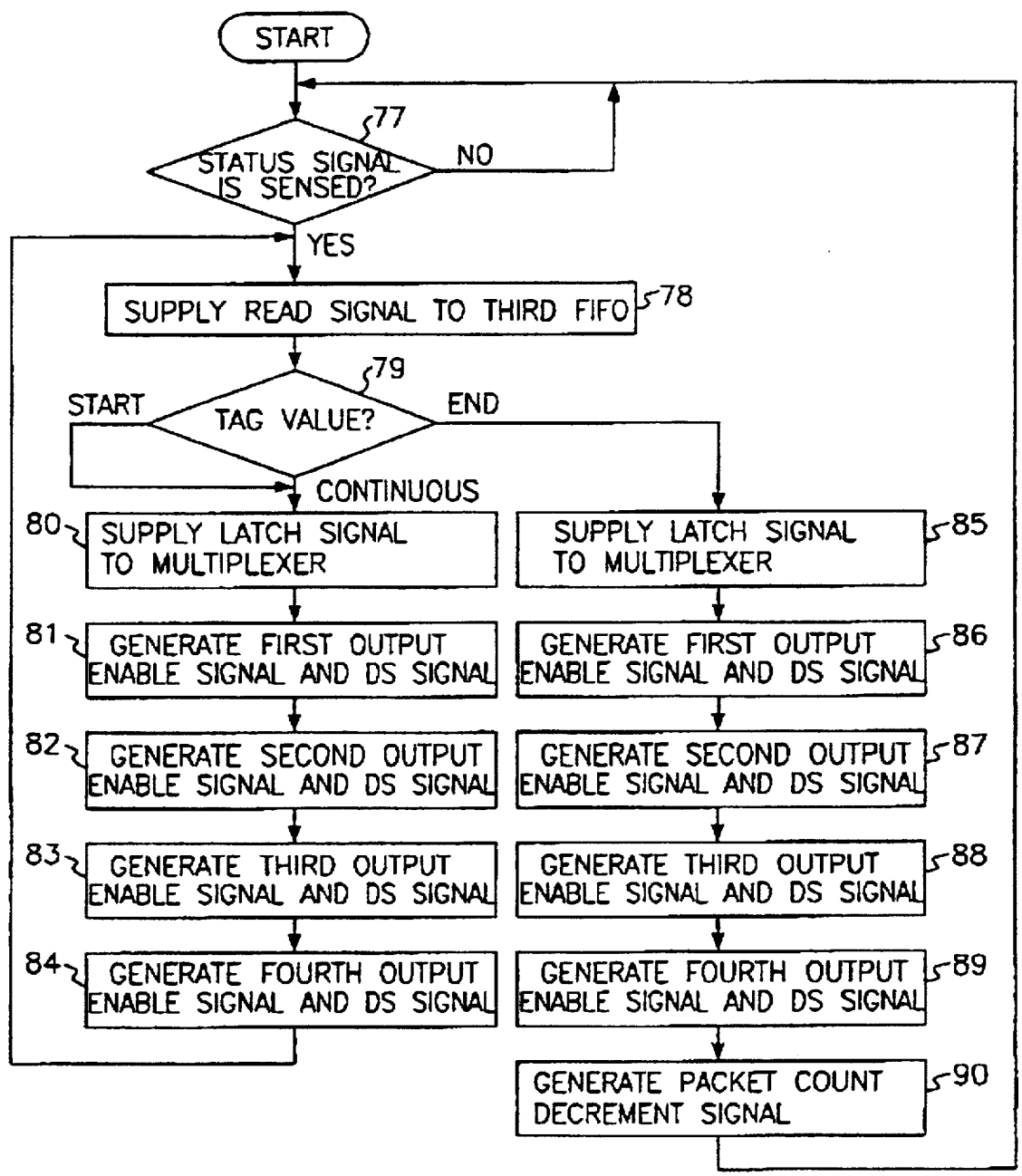
FIG. 6B is a flow chart showing an operation of a second timing control and state manager of the subscriber input/output device of FIG. 4.

FIGS. 6A and 6B illustrate operational flows of the first and second timing control and state managers 19 and 25, respectively.

Referring to FIG. 6A, if the DS signal is received from the serial communication receiver 7 (step 60), the first timing control and state manager 19 counts the DS signal by modular-4 (step 61), and analyzes the count value (step 62). If the count value is "1", the first timing control and state manager 19 supplies the first latch signal to the demultiplexer 8 (step 63). If the count value is "2", the first timing control and state manager 19 generates the second latch signal (step 64). If the count value is "3", the first timing control and state manager 19 generates the third latch signal (step 65). If the count value is "0", the first timing control and state manager 19 generates the fourth latch signal (step 66).

After the fourth latch signal is generated, a tag state value received from the first tag analyzer 9 is analyzed (step 67). If the tag value is the start state, the first timing control and state manager 19 stores the field length information (step 68), and supplies the write signal to the first FIFO 11 (step 69). If the tag value is the continuous state, the first timing control and state manager 19 continuous to supply the write signal to the first FIFO 11 (step 70). If the tag state is the end state, the first timing control and state manager 19 supplies the CRC check request signal to the CRC detector 10 (step 71), and receives the error presence/absence signal from the CRC detector 10 (step 72). If there are no errors, the first timing control and state manager 19 supplies the write signal to the first FIFO 11 (step 73), loads the length value to the DMA circuit 12 (step 74), and supplies the start signal for transmitting data to the DMA circuit 12 (step 75). If an error is detected, the packet is eliminated (step 76).

Referring to FIG. 6B, the second timing control and state manager 25 senses the status signal from the second packet counter 23 (step 77). If the state value is above "1", the second timing control and state manager 25 supplies the read signal to the third FIFO 22 (step 78), and analyzes the tag value received from the second tag analyzer 26 (step 79). If the tag value is the start or continuous state, the second timing control and state manager 25 supplies the latch signal to the multiplexer 21 (step 80). The second timing control and state manager 25 sequentially generates the first output enable signal OE1 and the DS signal (step 81), the second output enable signal OE2 and the DS signal (step 82), the third output enable signal OE3 and the DS signal (step 83), and the fourth output enable signal OE4 and the DS signal (step 84). These processes are repeated until the tag value is an end state. If the tag value is the end state, the second timing control and state manager 25 supplies the latch signal to the multiplexer 21 (step 85). The second timing control and state manager 25 sequentially generates the first output enable signal OE1 and the DS signal (step 86), the second output enable signal OE2 and the DS signal (step 87), the third output enable signal OE3 and the DS signal (step 88), the fourth output enable signal OE4 and the DS signal (step 89), and the packet count decrement signal(step 90), and returns to an initial state.

In the preferred embodiment, devices "AM7968" and "AM7969" manufactured by AMD Co., are used as a transmitting/receiving serial communication device. The serial input/output data with 100 Mbps is received and generated from the serial communication device as 8-bit data. The 8-bit data is multiplexed/demultiplexed to 32-bit parallel data to be matched for the high-speed packetarbitration switching device. Since the speed of 100 Mbps is multiplexed to 32 bits, a clock speed of 100 MHz is needed. If the data is converted to one byte, the clock speed of 12.5 MHz is possible. If the data is again multiplexed to 32 bits, the clock speed of 3.125 MHz is processed. Therefore, a relatively low-cost and low-speed device and memory may be used. The inventive subscriber input/output device has a system bus structure based on the parallel common bus and processes the polling, mediating and switching operations by a dedicated processor in parallel. Therefore, the efficiency of bus utilization is raised and the system may be enlarged. Since the inventive subscriber input/output device supports the broadcasting and multicasting, and serially communicates with the subscriber node, it may be used as a short communication network of a star shape or an internal high-speed linked network of a large-scale communication system.

What is claimed is:

1. A subscriber input/output device of a high-speed packet switching system with a parallel common bus type, said subscriber input/output device comprising:

serial communication receiving means for receiving serial data of packet data and a tag, and generating a data strobe signal;

demultiplexing means for latching the output of said serial communication receiving means according to a latch signal, and generates data and a tag;

first tag analyzing means for receiving the tag of said demultiplexing means, and detecting a start tag, a continuous tag and an end tag;

cyclic redundancy code detecting means for receiving an error detecting code from said demultiplexing means, and detecting a cyclic redundancy code according to a check request signal;

direct memory access means for generating a read signal and a write signal by a field length value and a start signal;

first FIFO (first-in first-out) means for storing the output data of said demultiplexing means according to a write signal, and generating the output data of said demultiplexing means according to said read signal of said direct memory access means;

second FIFO means for storing the output of said first FIFO means according to said write signal of said direct memory access means, and generating the output of said first FIFO means according to a read signal received;

address interpreting means for receiving a polling address, a source address, a destination address, a polling address strobe signal, a source address strobe signal and a destination address strobe signal, and generating a polling select signal, a source select signal and a destination select signal;

first AND gate means for ANDing said source select signal of said address interpreting means with an external packet count decrement signal, and generating a packet count decrement signal;

first packet counting means for increasing a count value according to a packet count increment signal of said direct memory access means, and decreasing the count value according to said packet count decrement signal of said first AND gate means;

third FIFO means for storing data and a tag received according to an external write signal, and generating the data and the tag according to a read signal;

second AND gate means for ANDing said destination select signal of said address interpreting means with an external packet count increment signal, and generating a packet count increment signal;

second packet counting means for increasing a count value according to said packet count increment signal of said second AND gate means, decreasing the count value according to a packet count decrement signal, and generating a status signal;

second tag analyzing means for receiving the tag of said third FIFO means, and detecting a start tag, a continuous tag and an end tag;

multiplexing means for multiplexing the output of said third FIFO means by a latch signal and an output enable signal;

serial communication transmitting means for converting the output of said multiplexing means to serial data by a data strobe signal, and generating the converted data;

first timing controlling and state managing means for supplying latch signals to said demultiplexing means by said data strobe signal of said serial communication receiving means, receiving said start, continuous and end tags from said first tag analyzing means, receiving a field length value of said demultiplexing means and supplying a write signal to said first FIFO means when the tag is a start state, continuing to supply said write signal to said first FIFO means when the tag is a continuous state, supplying a check request signal for cyclic redundancy code detecting timing to said cyclic redundancy code detecting means when the tag is an end state, receiving an error presence/absence signal from said cyclic redundancy code detecting means, eliminating a packet when there are errors, and receiving one frame and supplying a field length value and a start signal to said direct memory access means when there are no errors; and second timing controlling and state managing means for supplying a read signal to said third FIFO means when said status signal is received from said second packet counting means, receiving start, continuous and end tags from said second tag analyzing means, sequentially supplying a latch signal and output enable signals to said multiplexing means, supplying a data strobe signal to said serial communication transmitting means, and supplying a count decrement signal to said second packet counting means.

2. A subscriber input/output device of a high-speed packet switching system as claimed in claim 1, further comprising:

first transmitting buffering means for generating data and a tag which is the output of said second FIFO means according to said source select signal of said address interpreting means;

second transmitting buffering means for receiving the count value of said first packet counting means, and generating a transmission request signal according to said polling select signal of said address interpreting means; and receiving buffering means for receiving data and a tag, and supplying the data and the tag to said third FIFO means according to said destination select signal of said address interpreting means.

3. A subscriber input/output device of a high-speed packet switching system as claimed in claim 1, wherein said demultiplexing means comprises:

first latch means for latching data and a tag firstly received from said serial communication receiving means by a first latch signal generated from said first timing controlling and state managing means;

second latch means for latching data and a tag secondly received from said serial communication receiving means by a second latch signal generated from said first timing controlling and state managing means;

third latch means for latching data and a tag thirdly received from said serial communication receiving means by a third latch signal generated from said first timing controlling and state managing means; and fourth latch means for latching data and a tag fourthly received from said serial communication receiving means by a fourth latch signal generated from said first timing controlling and state managing means.

4. A subscriber input/output device of a high-speed packet switching system as claimed in claim 1, wherein said multiplexing means comprises:

first latch means for latching the data and the tag generated from said third FIFO means by said latch signal generated from said second timing controlling and state managing means to be supplied to said serial communication transmitting means according to a first output enable signal of said second timing controlling and state managing means;

second latch means for latching the data and the tag generated from said third FIFO means by said latch signal generated from said second timing controlling and state managing means to be supplied to said serial communication transmitting means according to a second output enable signal of said second timing controlling and state managing means;

third latch means for latching the data and the tag generated from said third FIFO means by said latch signal generated from said second timing controlling and state managing means to be supplied to said serial communication transmitting means according to a third output enable signal of said second timing controlling and state managing means; and fourth latch means for latching the data and the tag generated from said third FIFO means by said latch signal generated from said second timing controlling and state managing means to be supplied to said serial communication transmitting means according to a fourth output enable signal of said second timing controlling and state managing means.

* * * * *